United States Patent
Bindra et al.

(10) Patent No.: US 7,964,119 B2
(45) Date of Patent: Jun. 21, 2011

(54) CHEMILUMINESCENT POWDERS AND METHODS OF MAKING AND USING THEREOF

(75) Inventors: Perminder S. Bindra, Fripp Island, SC (US); Mark A. Kluttz, Fripp Island, SC (US); Shawn P. Hodgson, Fripp Island, SC (US); Reid Pannill, Fripp Island, SC (US)

(73) Assignee: Mega Glow, LLC.

( * ) Notice: Subject to any disclaimer, the term of this patent is extended or adjusted under 35 U.S.C. 154(b) by 98 days.

(21) Appl. No.: 12/464,299

(22) Filed: May 12, 2009

(65) Prior Publication Data

US 2010/0288984 A1 Nov. 18, 2010

(51) Int. Cl.
*C09K 3/00* (2006.01)

(52) U.S. Cl. .................................... 252/700; 362/34

(58) Field of Classification Search ................. 252/700; 422/52, 61; 362/34
See application file for complete search history.

(56) References Cited

U.S. PATENT DOCUMENTS

| | | |
|---|---|---|
| 3,539,794 A | 11/1970 | McKay |
| 3,671,450 A | 6/1972 | Rauhut |
| 3,816,325 A | 6/1974 | Rauhut |
| 4,626,383 A | 12/1986 | Richter |
| 4,814,949 A | 3/1989 | Elliott |
| 5,043,851 A | 8/1991 | Kaplan |
| 5,121,302 A | 6/1992 | Bay |
| 5,122,306 A | 6/1992 | Van Moer |
| 5,173,218 A | 12/1992 | Cohen |
| 5,705,103 A | 1/1998 | Chopdekar |
| 6,062,380 A | 5/2000 | Dorney |
| 6,143,514 A | 11/2000 | Ullman et al. |
| 6,251,581 B1 | 6/2001 | Ullman et al. |
| 6,406,667 B1 | 6/2002 | Singh et al. |
| 6,417,402 B1 | 7/2002 | Das et al. |
| 7,674,406 B2 * | 3/2010 | Bindra et al. ............... 252/700 |
| 2003/0155560 A1 | 8/2003 | Palmer |
| 2005/0098766 A1 | 5/2005 | Watson, Jr. |
| 2007/0020704 A1 | 1/2007 | Wilhelm et al. |
| 2008/0157039 A1 | 7/2008 | Zuckerman |
| 2008/0308776 A1 | 12/2008 | Bindra et al. |

FOREIGN PATENT DOCUMENTS

CN 101 205 462 A 6/2008

OTHER PUBLICATIONS

European Search Report from European Patent Office; Postbus 5818, 2280 HV Rijswijk, Netherlands; European Application No. 10251154.0; Dated Dec. 6, 2010; 6 pgs.

* cited by examiner

*Primary Examiner* — David Wu
*Assistant Examiner* — Vu A Nguyen
(74) *Attorney, Agent, or Firm* — Gardner Groff Greenwald & Villanuava, PC

(57) ABSTRACT

Described herein are chemiluminescent powders that can be applied to a variety of substrates that are generally sensitive to existing chemiluminescent compositions. Methods for producing the chemiluminescent compositions are also provided.

14 Claims, No Drawings

CHEMILUMINESCENT POWDERS AND METHODS OF MAKING AND USING THEREOF

BACKGROUND

Chemiluminescent compositions generally utilize a two-component system to chemically generate light. The two components, which are usually in the form of chemical solutions, are referred to as the "activator" component and the "oxalate" component. The activator and oxalate are mixed together when chemiluminescent light is desired. The activator component includes a peroxide compound and a catalyst while the oxalate component includes an oxalate ester. The composition also includes a fluorescer, which may be present in either or both components. The chemiluminescent composition also includes a solvent or mixture of solvents for the activator component and a solvent for the oxalate component. The solvents for the two components may be different but are miscible with one another.

Chemiluminescent compositions typically are contained in devices in which the two components are kept physically separated prior to activation by a variety of methods. Often, the devices contain each component in separate chambers and when the production of chemiluminescent light is desired, a chamber is ruptured in a manner such that the two components are allowed to intermix. A popular example of this type of device is the "light stick." Here, a sealed frangible glass vial containing one component is housed within an outer flexible container containing the other component, which is also sealed. Flexing the outer container causes the vial to rupture, thereby releasing the component and allowing the two components to mix and produce light. Although this approach has been widely used, it still limited to certain applications.

SUMMARY OF EMBODIMENTS

Described herein are chemiluminescent powders that can be applied to a variety of substrates that are generally sensitive to existing chemiluminescent compositions. Methods for producing the chemiluminescent compositions are also provided. The advantages of the invention will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Before the present compounds, compositions, and/or methods are disclosed and described, it is to be understood that the aspects described below are not limited to specific compounds, synthetic methods, or uses as such may, of course, vary. It is also to be understood that the terminology used herein is for the purpose of describing particular aspects only and is not intended to be limiting.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise. Thus, for example, reference to "a solvent" includes mixtures of two or more such solvents, and the like.

"Optional" or "optionally" means that the subsequently described event or circumstance can or cannot occur, and that the description includes instances where the event or circumstance occurs and instances where it does not. For example, the phrase "optionally contains a plasticizer" means that the plasticizer may or may not be present.

References in the specification and concluding claims to parts by weight, of a particular element or component in a composition or article, denotes the weight relationship between the element or component and any other elements or components in the composition or article for which a part by weight is expressed.

Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

Described herein are chemiluminescent powders and methods of making and using thereof. The powders are generally composed of an activator and a luminescer. In one aspect, the chemiluminescent powder comprises (i) water and at least one organic solvent; (ii) an oxidant, and (iii) a chelating agent, a plasticizer, a thickener, a buffering agent, a catalyst or any combination thereof; (iv) an oxalate; (v) a fluorescer; and (vi) a plurality of solid particles comprising one or more inorganic oxides, wherein none of components (i)-(vi) have a specific binding pair member bonded to it. Components (i)-(iii) are generally part of the activator, while the oxalate and fluorescer form the luminescer. The plurality of solid particles are dispersed throughout the composition to produce the powder. Each component of the activator and luminescer as well as the solid particles is described in detail below.

The activator includes water and at least one organic solvent. The water and additional organic solvent is used to facilitate dissolving other solids in the activator. Additionally, the organic solvent can be used as a thickening agent. In one aspect, the organic solvent comprises a polyol. The term "polyol" is defined herein as a compound with two or more hydroxyl groups. Examples of polyols useful herein include, but are not limited to, glycerin and polyethylene glycol. The amount of solvent can vary depending upon the components selected to produce the activator. In one aspect, the amount of water is from 1 to 10%, 2 to 8%, 2 to 6%, or 2 to 4% by weight of the activator. In another aspect, the organic solvent is up to 2% by weight of the activator.

The activator includes an oxidant. The function of the oxidant will be discussed below. In general, the oxidant is any compound that can react (i.e., oxidize) the oxalate in the luminescer. In one aspect, the oxidant comprises hydrogen peroxide. In another aspect, the oxidant comprises a hydrogen peroxide precursor. The term "hydrogen peroxide precursor" as used herein is defined as any compound that produces hydrogen peroxide in situ. For example, the hydrogen peroxide precursor can react with water to produce hydrogen peroxide. Examples of hydrogen peroxide precursors include, but are not limited to, urea peroxide, hydrogen peroxide, sodium peroxide, sodium perborate, sodium pyrophosphate peroxide, or any combination thereof. The oxidants disclosed in U.S. Pat. Nos. 3,539,794 and 5,705,103, which are incorporated by reference in their entireties, can be used herein. In one aspect, the amount of oxidant is from 2 to 20%, or 5 to 15%, by weight of the activator.

The activator also includes one or more chelating agents. In one aspect, the chelating agent comprises a polyamine or the salt thereof. The term "polyamine" as used herein is defined as any compound that possesses two or more substituted or unsubstituted amino groups (mono-, di, -tri-, or quaternary). In one aspect, the chelating agent comprises disodium EDTA. In another aspect, the amount of chelating agent is less than 5%, less than 3%, less than 1%, less than 0.5%, or less than 0.1% by weight of the activator.

The activator can optionally include a plasticizer, a thickener, a buffering agent, a catalyst, or any combination thereof. In one aspect, the activator includes a plasticizer, a thickener, a chelating agent, a buffering agent, and a catalyst. Each component is described in detail below.

In one aspect, the plasticizer comprises a phthalate, an adipate, a trimellitate, a sebacate, a benzoate, an organophosphate, a sulfonamide, a citrate, a vinyl halide, a vinylidene halide, or any combination thereof. In another aspect, the plasticizer comprises a dialkyl phthalate. The term "alkyl group" as used herein is a branched or unbranched saturated hydrocarbon group of 1 to 24 carbon atoms, such as methyl, ethyl, n-propyl, isopropyl, n-butyl, isobutyl, t-butyl, pentyl, hexyl, heptyl, octyl, decyl, tetradecyl, hexadecyl, eicosyl, tetracosyl and the like. A "lower alkyl" group is an alkyl group containing from one to six carbon atoms. In one aspect, the plasticizer is dimethyl phthalate. In one aspect, the amount of plasticizer is from 0.5 to 10% or 1 to 5% by weight of the activator.

The use of a catalyst can enhance the quantum yield of the chemiluminescent reaction. The catalysts disclosed in U.S. Pat. Nos. 3,539,794 and 5,705,103, which are incorporated by reference in their entireties, can be used herein. In one aspect, the catalyst comprises a quaternary ammonium compound, quaternary arsenic compound, or a quaternary phosphorous compound. In another aspect, the catalyst comprises a benzyltrialkyl ammonium compound or a salicylate salt. As will be discussed below, the nature and amount of catalyst used can affect the duration and intensity of the chemiluminescent reaction. In one aspect, the amount of catalyst is from 0.5 to 10% or 1 to 5% by weight of the activator.

Turning the luminescer, the oxalate compound can be a substituted or unsubstituted alkyl or aryl oxalate ester or salt thereof. The term "aryl group" as used herein is any carbon-based aromatic group including, but not limited to, benzene, naphthalene, etc. The term "aryl" also includes "heteroaryl group," which is defined as an aromatic group that has at least one heteroatom incorporated within the ring of the aromatic group. Examples of heteroatoms include, but are not limited to, nitrogen, oxygen, sulfur, and phosphorus. The aryl group can be substituted or unsubstituted. The aryl group can be substituted with one or more groups including, but not limited to, alkyl, alkynyl, alkenyl, aryl, halide, nitro, amino, ester, ketone, aldehyde, hydroxy, carboxylic acid, or alkoxy. The term "alkyl" is defined above.

In one aspect, the oxalate compound is a solid that can be finely ground into a powder. This will ensure that the oxalate is uniformly distributed throughout the activator. In one aspect, the amount of oxalate compound is from 1 to 20%, 5 to 10%, 5 to 20%, or 5 to 15% by weight of the luminescer. In one aspect, the oxalate compound comprises bis-(2,4,5-trichlorophenyl)-6-carbopentoxyphenyl)oxalate (CPPO) or bis-(2,4,5-ti-dichlorophenyl)oxalate (TCPO).

The second component of the luminescer includes a fluorescer. Suitable fluorescers have spectral emissions in the visible range (between 330 nm and 700 nm) and in the infra-red range (between 700 nm and 1000 mm). The wavelength of the light emitted, i.e., the color of the light emitted, by the chemiluminescent compositions can vary depending upon the particular fluorescer employed. In one aspect, the fluorescers in Table 1 that emit light of the four primary colors of the visible spectrum can be used herein.

TABLE 1

| Color | Fluorescer |
|---|---|
| Yellow | 2-chloro-9.10-bis(4-ethoxyphenyl)anthracene; 1,5-dichloro-9,10-bis(phenylethynyl)anthracene and 1,8-dichloro-9,10-bis(phenylethynyl)anthracene |
| Red | 1,7-dibromo-6,12-diphenoxy-N,N'-bis(2-isopropylphenyl)-3,4,9,10-perylenedicarboximide; 1,6,7,12-tetraphenoxy-N,N'-diethyl-3,4,9,10-perylenedicarboximide; 1,6,7,12-tetra(p-fluorophenoxy)-N,N'-bis(2,6-diisopropylphenyl)-3,4,9,10-perylenedicarboximide; 1,6,7,12-tetra(o-fluorophenoxy)-N,N'-bis(2,6-diisopropylphenyl)-3,4,9,10-perylenedicarboximide; 1,6,7,12-tetra(o-chlorophenoxy)-N,N'-bis(2,6-diisopropylphenyl)-3,4,9,10-perylenedicarboximide; 1,6,7,12-tetra(p-fluorophenoxy)-N,N'-bis(2,6-diisopropylphenyl)-3,4,9,10-perylenedicarboximide; 1,6,7,12-tetra(p-t-butylphenoxy)-N,N'-bis(2,6-diisopropylphenyl)-3,4,9,10-perylenedicarboximide; 1,6,7,12-tetraphenoxy-N,N'-di-neopentyl-3,4,9,10-perylenedicarboximide; 1,6,7,12-tetra(p-bromohenoxy)-N,N'-bis(2,6-diisopropylphenyl)-3,4,9,10-perylenedicarboximide; 1,6,7,12-tetraphenoxy-N,N'-bis(2,5-di-t-butylphenyl)-3,4,9,10-perylenedicarboximide; 1,6,7,12-tetraphenoxy-N,N'-bis(2,6-diisopropylphenyl)-3,4,9,10-perylenedicarboximide; |
| Blue | 2-chloro-9.10-bis(4-ethoxyphenyl)anthracene; 1-chloro-9.10-bis(4-ethoxyphenyl)anthracene |
| Green | 9,10-bis(phenylethynyl)anthracene; 2-ethyl-9,10-bis(phenylethynyl)anthracene; 2-chloro-9.10-bis(4-methoxyphenyl)anthracene; 1-chloro-9.10-bis(phenylethynyl)anthracene |
| Orange | 5,6,11,12-tetraphenylnaphthacene |

Examples of fluorescers that emit light in the IR include, but are not limited to, N,N'-bis(2,5,-di-tert-butylphenyl)-3,4,9,10-perylenedicarboximide, 16,17-butyloxyviolanthrone; 1-N,N-dibutylaminoabnthracene; or 6-methylacridinium iodide.

In certain aspects, it is desirable to obtain a variety of different fluorescent colors for which a suitable fluorescer is not available. It is contemplated that two or more fluorescers can be used simultaneously in the compositions described herein to achieve specific colors. The selection of particular fluorescers and their relative concentrations can produce a variety of different colors. Table 2 lists some possible combinations of fluorescers that emit light for the following colors: orange, pink, purple, turquoise and white.

TABLE 2

| Color/Dye | Trade/other name of the fluorescent compound |
|---|---|
| Green | 9,10-bis(phenylethynyl)anthracene |
| Yellow | 1,8-dichloro-9,10-bis(phenylethynyl)anthracene |
| Red | N,N'-bis(2,5,-di-tert-butylphenyl)-3,4,9,10-perylenedicarboximide |
| Blue | 2-chloro-9.10-bis(4-ethoxyphenyl)anthracene |
| Orange | 2-methyl-1-anthraquinonylamine |
| Pink | Combination of Red and Blue dyes |
| Purple | Combination of Red and Blue dyes |
| Turquoise | Combination of Green and Blue dyes |
| White | Combination of Red, Yellow and Blue dyes |
| Infrared | 16,17-butyloxyviolanthrone |

In one aspect, the fluorescer is a solid that can be finely ground into a powder. Similar to the oxalate compound, this will ensure that the fluorescer is uniformly distributed throughout the activator.

Another component present in the powders described herein includes a plurality of solid particles. Not wishing to be bound by theory, the chemiluminescence reaction between the activator and luminescer occurs at the surface of the solid particles, that is, it is a heterogeneous reaction. Depending upon the selection of the solid particles, the particles may or may not form chemical bonds with any of the components present in the activator and luminescer. In one aspect, the solid particles are inert (i.e., do not form covalent bonds or non-covalent bonds with the components in the activator and luminescer). For example, the solid particles can merely adsorb the components of the activator and luminescer.

In one aspect, the solid particles include inorganic materials such inorganic oxides, salts, and elements. Examples of inorganic oxides include, but are not limited to, silicon dioxide, aluminum oxide, an alkali metal oxide, an alkaline earth metal oxide, diatomaceous earth, zeolite, or any combination thereof. Different forms of these can be used herein. For example, fused or colloidal silicon dioxide can be used herein. Examples of inorganic salts include carbonates, silicates, and other natural or synthetic materials. It is also contemplated that the inorganic oxides and salts can include additional components. For example, diatomaceous earth contains silicon dioxide with small amounts of elemental metals such as sodium, magnesium, and iron.

Mixtures of inorganic oxides and salts can be used as well. For example, zeolites are aluminosilicate materials that include mixtures of $SiO_2$, $Al_2O_3$, and $Na_2O$. Examples of zeolites useful herein include, but are not limited to, amicite, analcime, barrerite, bellbergite, bikitaite, boggsite, brewsterite, chabazite clinoptilolite, cowlesite, dachiardite, edingtonite, epistilbite, erionite, faujasite, ferrierite, garronite, gismondine, gmelinite, gobbinsite, gonnardite, goosecreekite, harmotome, herschelite, heulandite, laumontite, levyne, maricopaite, mazzite, merlinoite, mesolite, montesommaite, mordenite, natrolite, offretite, paranatrolite, paulingite, perlialite, phillipsite, pollucite, scolecite, sodium dachiardite, stellerite, stilbite, tetranatrolite, thomsonite, tschemichite, wairakite, wellsite, willhendersonite, yugawaralite, or any combination thereof.

The amount of solid particles used to prepare the powders can vary; however, it is generally present in the powder in high amounts. The amount of solid particles present in the powder can vary reaction rates between the different components present in the powder (e.g., oxidizer, oxalate, fluorescer), which can ultimately modify glow time and intensity. The amount of solid particles can also modify the texture of the powder. For example, if it is desirable to have a "drier" powder, more solid particles can be added. In one aspect, the solid particles are from 50% to 95%, 60% to 95%, or 70% to 90% by weight of the powder.

The preparation of the chemiluminescent powder is described below. The different components of the activator are mixed with one another in various sequences to produce a homogeneous composition. In one aspect, the solvent, chelating agent, and oxidant are premixed. Next, the inorganic material is added. Here, optional components such as thickeners can be added as well. The mixture is mixed for a sufficient time to ensure all components are dispersed throughout the powder. Finally, the fluorescer and oxalate are added to the mixture to produce the final chemiluminescent powder. For the most part, the powder is dry; however, due to the presence of water, the powder may be a little moist.

In another aspect, the activator and luminescer can be stored in separate packages prior to admixing with one another. In one aspect, prior to using the chemiluminescent powder, the activator and the luminescer are kept in separate packages, where the packages do not permit air to enter and react with the components of the activator and luminescer. In this aspect, the solid particles of inorganic materials are incorporated into each package. For example, the activator and luminescer can be placed in separate hermetically sealed aluminum foil bubble packs to maintain the shelf-life of the activator and luminescer. When it is time to use the chemiluminescent powder, the activator is released from the package into an open container, and the luminescer, is admixed with the activator by vigorous stirring. Thus, the reaction proceeds in the open air, which is not the case with prior art chemiluminescent compositions.

The components present in the activator and luminescer react with one another upon mixing to produce visible or infrared light. Not wishing to be bound by theory, the oxidant (e.g., $H_2O_2$) reacts with the oxalate compound to produce a very highly reactive cyclic peroxy species. This species then excites the fluorescer. The excited fluorescer emits a photon (i.e., radiates the energy) then returns to the stable ground state. The color of the emitted light depends on the frequency in the visible spectrum range at which the photon is emitted from the fluorescer.

The reaction rate between the components of the activator and luminescer, which determines the intensity and duration of glow, can be modified by controlling the rate of diffusion of, among other things, the oxidant, the oxalate compound, and the fluorescer in the chemiluminescent composition. For example, by adjusting the concentration of the solvents, plasticizers, thickeners, and chelating agents, the glow intensity and duration can be specifically controlled. Thus, the compositions described herein can emit colored light from 1 hour up to 12 hours.

Because the compositions described herein generally do not use objectionable organic solvents that have odor and staining properties, the compositions described herein can be applied to numerous substrates. Moreover, the compositions are much less toxic. As described above, the compositions can be applied topically to skin or hair. Alternatively, the compositions can be applied to articles of clothing or other substrates. The powders described herein distinguished from chemiluminescent compositions used in other applications such as analytical techniques. For example, the compositions described herein do not have specific binding partners (e.g., ligands) as defined in U.S. Pat. No. 6,251,581 bonded to any of the components used to produce the powders herein. In general, the powders described herein are intended to be used in dry form that can be applied directly to the surface of a substrate.

EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example 1

This example provides the composition for high-glow intensity glow powder. Tables 3 and 4 provide the ingredients for producing the activator and luminescer, respectively. Table 5 lists the sequence for producing high-glow intensity glow powder with time duration of 4-6 hours. The mixing process is carried out in several steps in a stainless steel apparatus to ensure that a well mixed powder is formed.

To make the well mixed powder, the liquid components of sequence 1 were added to the stainless steel apparatus with an in-built homogenizer and heated to about 35° C. at an RPM of 2,000-2,500 to ensure total mixing. As soon as this mixture was cooled to room temperature, sequence 2 was added. Sequence 3 ingredients were then added, a little at a time, with adequate stirring, i.e., 200-250 RPM to ensure a well mixed powder. This is followed by the addition of sequence 4 ingredients.

Sequence 4 is the luminescer. A powdered form of CPPO and the fluorescer were mixed and ground to a finer powder. The luminescer powder was added to the activator powder and agitated under quality control conditions to validate the reaction time and color. A high intensity glow was observed immediately which lasted for as much as 6 hours.

TABLE 3

Concentration ranges and the ingredients for the high intensity glow powder activator with glow times ranging from 4 to 6 hours

| No. | INCI Name | Function | CAS No. | Conc. (w %) |
|---|---|---|---|---|
| 1 | Aqua | Solvent | 7732-18-5 | 2.9-3.3 |
| 2 | PEG-400 | Humectant/solvent | 25322-68-3 | <1 |
| 3 | Diatomaceous Earth | Absorbent | 61790-53-2 | 2-3 |
| 4 | Silica Powder | High Area Surface | 7631-86-9 | 40-50 |
| 5 | Urea peroxide | Oxidizer | 124-43-6 | 5-15 |
| 6 | Dimethyl phthalate | Solvent/plasticizer | 131-11-3 | 3-7 |
| 7 | Disodium EDTA | Chelating/viscosity controlling | 6381-92-6 | <0.1 |
| 8 | Aluminum Oxide | Inert Granular Material | 1344-28-1 | 10-15 |
| Total | | | | 65-95 |

TABLE 4

Concentration ranges of the ingredients in the Luminescer powder

| No. | Trade/other name | Function | CAS No. | Conc. (w %) |
|---|---|---|---|---|
| | Fluorescer | Dye | | 0.2-0.3 |
| | Bis-(2,4,5-trichlorophenyl)-6-carbopentoxyphenyl)-oxalate (CPPO) | Chemiluminescent compound | 30431-54-0 | 5-15 |
| | Silica Powder | High Area Surface | | 10-20 |
| | Aluminum Oxide | Inert granular Material | | 5-10 |
| Total | | | | 20-45 |

TABLE 5

Sequencing for the ingredients of the high-intensity glow powder with glow times ranging from 4 to 6 hours

| Sequence No. | Ingredients |
|---|---|
| 1 | Water, PEG-400, Dimethyl phthalate, Disodium EDTA, Urea peroxide |
| 2 | Carbopol, Diatomaceous earth |
| 3 | Aluminum Oxide, Silica Powder |
| 4 | Fluorescer, CPPO |

Throughout this application, various publications are referenced. The disclosures of these publications in their entireties are hereby incorporated by reference into this application in order to more fully describe the compounds, compositions and methods described herein.

Various modifications and variations can be made to the compounds, compositions and methods described herein. Other aspects of the compounds, compositions and methods described herein will be apparent from consideration of the specification and practice of the compounds, compositions and methods disclosed herein. It is intended that the specification and examples be considered as exemplary.

What is claimed:

1. A chemiluminescent powder comprising (i) water and at least one organic solvent; (ii) an oxidant, and (iii) a chelating agent; (iv) an oxalate; (v) a fluorescer; and (vi) a plurality of solid particles comprising one or more inorganic materials, wherein none of components (i)-(vi) have a specific binding pair member bonded to it.

2. The composition of claim 1, wherein the organic solvent comprises a polyol.

3. The composition of claim 1, wherein the organic solvent comprises a polyethylene glycol, glycerin or a combination thereof.

4. The composition of claim 1, wherein the oxidant comprises hydrogen peroxide or a hydrogen peroxide precursor.

5. The composition of claim 1, wherein the oxidant comprises urea peroxide, hydrogen peroxide, sodium peroxide, sodium perborate, sodium pyrophosphate peroxide, or any combination thereof.

6. The composition of claim 1, wherein the composition further comprises a plasticizer, and wherein the plasticizer comprises a phthalate, an adipate, a trimellitate, a sebacate, a benzoate, an organophosphate, a sulfonamide, a citrate, a vinyl halide, a vinylidene halide, or any combination thereof.

7. The composition of claim 6, wherein the plasticizer comprises a dialkyl phthalate.

8. The composition of claim 1, wherein the oxalate compound comprises a substituted or unsubstituted aryl or alkyl oxalate ester.

9. The composition of claim 1, wherein the oxalate compound comprises bis-(2,4,5-trichlorophenyl)-6-carbopentoxyphenyl)oxalate (CPPO) or bis-(2,4,5-trichlorophenyl)oxalate (TCPO).

10. The composition of claim 1, wherein the fluorescer comprises 2-chloro-9,10-bis(4-ethoxyphenyl)anthracene; 1,5-dichloro-9,10-bis(phenylethynyl)anthracene and 1,8-dichloro-9,10-bis(phenylethynyl)anthracene; Rubrene; 1,7-dibromo-6,12-diphenoxy-N,N'-bis(2-isopropylphenyl)-3,4,9,10-perylenedicarboximide; 1,6,7,12-tetraphenoxy-N,N'-diethyl-3,4,9,10-perylenedicarboximide; 1,6,7,12-tetra(o-fluorophenoxy)-N,N'-bis(2,6-diisopropylphenyl)-3,4,9,10-perylenedicarboximide; 1,6,7,12-tetra(p-fluorophenoxy)-N,N'-bis(2,6-diisopropylphenyl)-3,4,9,10-perylenedicarboximide; 1,6,7,12-tetra(o-chlorophenoxy)-N,N'-bis(2,6-diisopropylphenyl)-3,4,9,10- perylenedicarboximide; 1,6,7,12-tetra(p-fluorophenoxy)-N,N'-bis(2,6-diisopropylphenyl)-3,4,9,10-perylenedicarboximide; 1,6,7,12-tetra(p-t-butylphenoxy)-N,N'-bis(2,6-diisopropylphenyl)-3,4,9,10-perylenedicarboximide; 1,6,7,12-tetraphenoxy)-N,N'-di-neopentyl-3,4,9,10-perylenedicarboximide; 1,6,7,12-tetra(p-bromohenoxy)-N,N'-bis(2,6-diisopropylphenyl)-3,4,9,10-perylenedicarboxinide; 1,6,7,12-tetraphenoxy-N,N'-bis(2,5-di-t-butylphenyl)-3,4,9,10-perylenedicarboximide; 1,6,7,12-tetraphenoxy-N,N'-bis(2,6-diisopropylphenyl)-3,4,9,10-perylenedicarboximide; 2-chloro-9,10-bis(4-ethoxyphenyl)anthracene; 1-chloro-9,10-bis(4-ethoxyphenyl)anthracene; 9,10-bis(phenylethynyl)anthracene, or a combination thereof.

11. The composition of claim 1, wherein the fluorescer emits light in the IR region.

12. The composition of claim 11, wherein the fluorescer comprises N,N'-bis(2,5,-di-tert-butylphenyl)-3,4,9,10-perylenedicarboximide; 16,17-butyloxyviolanthrone; 1-N,N-dibutylaminoabnthracene; or 6-methylacridinium iodide.

13. The composition of claim 1, wherein the inorganic material comprises an inorganic salt, an inorganic oxide, an inorganic element, or any combination thereof.

14. The composition of claim 13, wherein the inorganic oxide comprises silicon dioxide, aluminum oxide, an alkali metal oxide, an alkaline earth metal oxide, diatomaceous earth, zeolite, or any combination thereof.

* * * * *

UNITED STATES PATENT AND TRADEMARK OFFICE
CERTIFICATE OF CORRECTION

PATENT NO. : 7,964,119 B2  
APPLICATION NO. : 12/464299  
DATED : June 21, 2011  
INVENTOR(S) : Perminder S. Bindra et al.

Page 1 of 1

It is certified that error appears in the above-identified patent and that said Letters Patent is hereby corrected as shown below:

In the Claims

In Column 8, Line 31, claim 1, after the word "it" please insert --, and wherein the chelating agent comprises disodium EDTA--

Signed and Sealed this  
Second Day of July, 2013

Teresa Stanek Rea  
*Acting Director of the United States Patent and Trademark Office*